United States Patent
Schmidt et al.

(10) Patent No.: US 11,576,300 B2
(45) Date of Patent: Feb. 14, 2023

(54) OPERATOR SPEED GUIDANCE FOR AN AGRICULTURAL PRODUCT APPLICATION SYSTEM

(71) Applicant: Vaderstad LLC, Wahpeton, ND (US)

(72) Inventors: Michael Dennis Schmidt, Maple Grove, MN (US); Collin David Miller, Mapleton, ND (US); Derrick Wolter, Fargo, ND (US)

(73) Assignee: Vaderstad LLC, Wahpeton, ND (US)

(*) Notice: Subject to any disclaimer, the term of this patent is extended or adjusted under 35 U.S.C. 154(b) by 346 days.

(21) Appl. No.: 16/788,456

(22) Filed: Feb. 12, 2020

(65) Prior Publication Data

US 2021/0243945 A1    Aug. 12, 2021

(51) Int. Cl.
  *A01C 21/00*    (2006.01)
  *A01C 15/00*    (2006.01)
  *A01C 7/10*     (2006.01)

(52) U.S. Cl.
  CPC ............ *A01C 21/005* (2013.01); *A01C 7/102* (2013.01); *A01C 15/006* (2013.01)

(58) Field of Classification Search
  CPC ..... A01C 21/005; A01C 7/102; A01C 15/006; A01C 21/00; A01C 7/10; A01C 7/08; A01C 7/00; A01C 15/005; A01C 15/00
  See application file for complete search history.

(56) References Cited

U.S. PATENT DOCUMENTS

| 9,148,990 B2 | 10/2015 | Redman et al. |
| 2008/0296208 A1 | 12/2008 | Ikeyama |

FOREIGN PATENT DOCUMENTS

| JP | 2009508665 A | * 5/2009 | ............ B01D 61/12 |

\* cited by examiner

*Primary Examiner* — Christopher J. Novosad

(74) *Attorney, Agent, or Firm* — Mai D. Lauer; Westman, Champlin & Koehler P.A.

(57) ABSTRACT

An agricultural product application system includes a controller and product dispensing apparatus. The product dispensing apparatus includes a metering module in communication with the controller and is configured to control a flow rate of product from a product source to product dispensing units. A display device is in communication with the controller. The controller receives operating limits and an application rate of the product dispensing apparatus. The controller determines a forward speed range based upon the operating limits and on the application rate. Display information is generated for providing a visual representation on the display device of the forward speed range.

20 Claims, 8 Drawing Sheets

OPERATOR SPEED GUIDANCE FOR AN AGRICULTURAL PRODUCT APPLICATION SYSTEM

FIELD

Embodiments of the present disclosure relate to agricultural product application systems. More particularly, embodiments of the present disclosure relate to apparatus and methods for controlling agricultural product application systems.

BACKGROUND

Agricultural product application systems include, by way of example, seeders, spreaders and sprayers which serve to apply products or crop inputs such as seed, fertilizer and pesticides through a plurality of product dispensing devices laterally spaced over a working width. Seeders for example typically include a plurality of seeding units which are configured to inject particulate material into a ground surface. In another example, sprayers typically include a plurality of nozzles or drop hoses which are configured to apply a crop input solution onto a growing crop or ground surface.

Some systems are adapted to apply more than one product simultaneously, for example seed and fertilizer or two fertilizer products. In such systems the different products are typically metered independently to allow for different application rates of each of the applied products. Furthermore, many product application systems include multiple metering modules each serving to meter product to a respective section of the plurality of product dispensing devices.

Metering devices typically operate with greatest accuracy within a preferred range of metering or flow rates, the preferred range often being dependent upon the product being metered. When operating at rates outside of the preferred range the metering accuracy can decrease significantly. Moreover, a metering device will typically have operating limits to the speed at which it can dispense product due to the physical limits of the associated meter drive apparatus.

Operators of known product application systems must often therefore use their skill and judgement to ensure that the metering devices do not operate outside of the respective preferred flow rate range which are often different between the metering devices due to the target application range of the product, variations in dispensed product, wear in the device, and section width.

SUMMARY

In accordance with one embodiment a controller for an agricultural application machine is configured to receive operating limits of product dispensing apparatus, receive an application rate of the product dispensing apparatus, and determine a forward speed range based upon the operating limits and on the application rate. The controller generates display information for providing a visual representation of the forward speed range to an operator of the application machine.

In one example the operating limits include a minimum operating limit and a maximum operating limit. For example, the operating limits could include a minimum meter drive speed and a maximum meter drive speed at which one or more metering devices can operate with an acceptable level of accuracy.

In another example the product dispensing apparatus comprises a plurality of product sources. Each one product source has associated therewith a respective metering module arranged to control a flow rate of product from the product source to one or more product dispensing units. The controller is further configured to concurrently receive a plurality of application rates of said metering modules, and determine the forward speed range based upon the plurality of application rates.

The controller may be further configured to determine a plurality of minimum forward speed values, wherein each one of said plurality of minimum forward speed values corresponds to a respective one of said plurality of current application rates. The controller may select a highest minimum forward speed value from the plurality of minimum forward speed values, and determine said forward speed range based upon the highest minimum forward speed value.

In one example the controller is further configured to determine a plurality of maximum forward speed values, wherein each one of said plurality of maximum forward speed values corresponds to a respective one of said plurality of current application rates. The controller may select a lowest maximum forward speed value from the plurality of maximum forward speed values, and determine the forward speed range based upon the lowest maximum forward speed value.

In another example the product dispensing apparatus comprises a plurality of metering modules. Each metering module is arranged to control a flow rate of product from a product source to a respective product dispensing section having a section width. Each product dispensing section comprises one or more product dispensing units. The controller may be further configured to receive a plurality of section width values, wherein each one of said plurality of section width values corresponds to a respective one of said product dispensing sections. The controller may further determine a plurality of flow rate values based upon the section width values and the application rate, wherein each one of said plurality of flow rate values corresponds to a respective one of said plurality of metering modules, and determine the forward speed range based upon the plurality of flow rate values.

The controller is preferably in communication with a user interface device. The controller may be configured to receive the current application rate from the user interface device.

The controller may comprise a memory configured to store an application prescription map. The controller may be in communication with a positioning system, wherein the controller is configured to determine the application rate from a position signal received from the positioning system and the application prescription map.

In accordance with another embodiment an agricultural product application system comprises a controller, product dispensing apparatus, and a display device in communication with the controller. The product dispensing apparatus includes a metering module in communication with the controller and is configured to control a flow rate of product from a product source to one or more product dispensing units. The controller is configured to receive operating limits of the product dispensing apparatus, receive an application rate of the product dispensing apparatus, and determine a forward speed range based upon the operating limits and on the application rate. The controller is further configured to generate display information for providing a visual representation on the display device of the forward speed range.

In one example the visual representation includes a bar graph in association with a speedometer dial having a speed scale. The bar graph may include a first bar of a first color displayed adjacent to a first zone of the speed scale corresponding to the forward speed range, and a second bar of a second color displayed adjacent to a second zone of the speed scale which is outside of the first zone and corresponds to a non-preferred forward speed range. The bar graph may further include a third bar of the second color displayed adjacent to a third zone of the speed scale which is outside of the first zone, wherein the second zone, first zone, and third zone are positioned in series adjacent to the speed scale. The bar graph may further include a fourth bar of a third color positioned between the second and first bars, and a fifth bar of the third color positioned between the first and third bars.

In one example the metering module comprises a meter and a meter drive, and wherein the operating limits include a minimum meter drive speed and a maximum meter drive speed.

In another example the product dispensing apparatus comprises a plurality of product sources, wherein each one product source has associated therewith a respective metering module. The controller is further configured to concurrently receive a plurality of application rates of said metering modules, and determine the forward speed range based upon the plurality of application rates.

In accordance with yet another embodiment a method of controlling an agricultural input application system comprising the steps of receiving operating limits of product dispensing apparatus, receiving an application rate of the product dispensing apparatus, determining a forward speed range based upon the operating limits and on the application rate, and displaying a visual representation of the forward speed range to an operator of the application machine.

This summary is provided to introduce a selection of concepts in a simplified form that are further described below in the Detailed Description. This summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure is referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure

DETAILED DESCRIPTION

The present disclosure generally relates to agricultural application machines for dispensing product to agricultural crop fields, and more specifically, but not by limitation, to the control of such machines.

The disclosed embodiments are of applications machines for dispensing particulate material including, by way of example, seed and granular fertilizer. However, it should be understood that aspects of the invention can be implemented with alternative agricultural application machines including sprayers for dispensing liquid products such as solutions of pesticide and fertilizer.

The terms "seed" and "fertilizer" are used in describing various embodiments for illustration convenience; their use is not intended to limit the scope of the concepts described herein. For example, one skilled in the art understands that in at least some of the described embodiments "fertilizer" and/or other particulate materials may be used in addition, or in the alternative, to "seed." Further, some agricultural applications may apply only one particulate material (i.e., seed only, fertilizer only, etc.), while other applications may apply two or more different particulate materials (i.e., seed and fertilizer, etc.).

Figure 1:
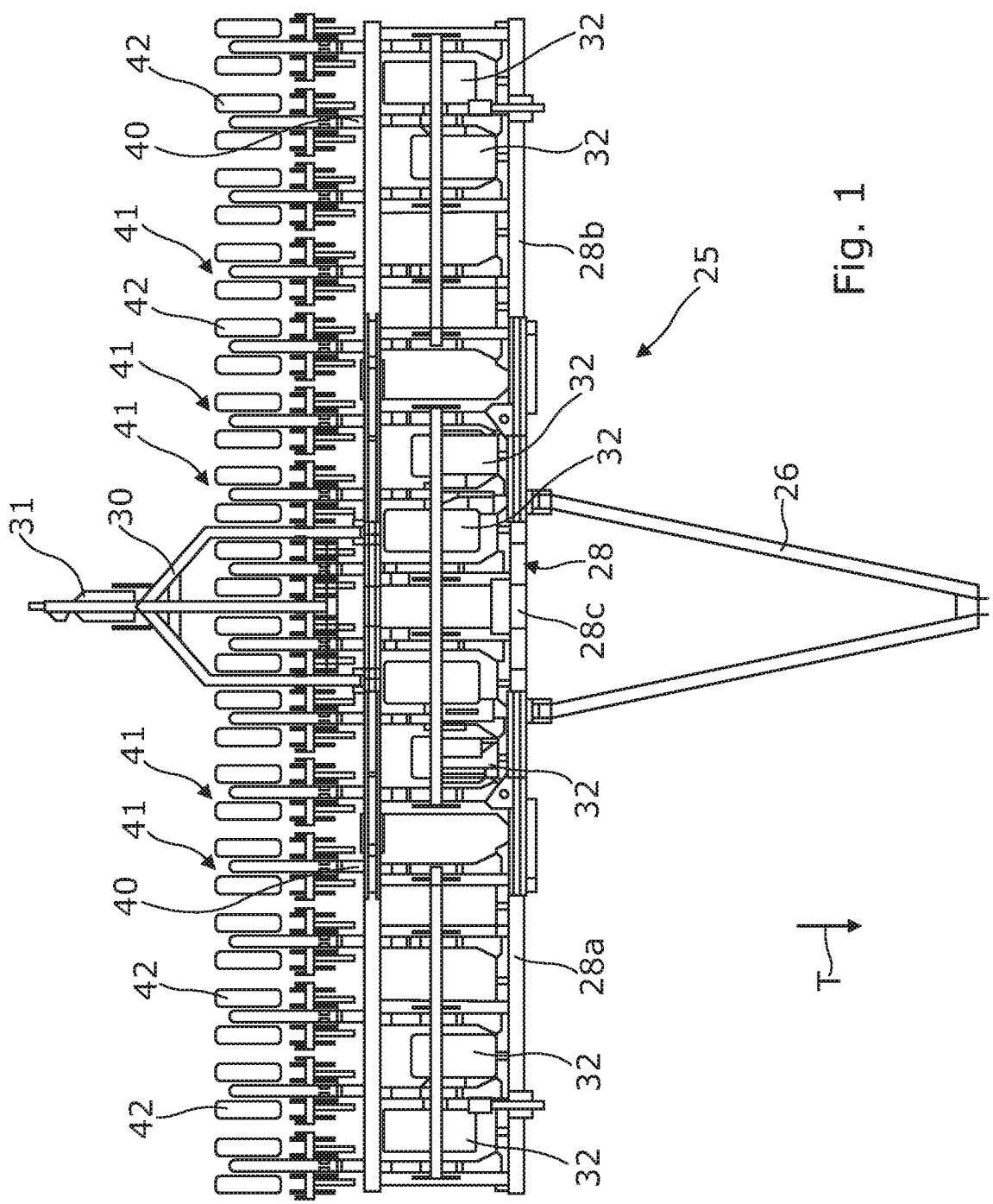
FIG. 1 is a top plan view of an exemplary agricultural implement.

FIG. 1 illustrates an agricultural implement 25 having a drawbar 26 for attachment to a vehicle (not shown) for pulling implement 25 across the ground (e.g., a tractor) in a direction of implement travel T. The drawbar 26 is connected to an implement frame 28, which may have one or more frame sections such as side folding frames sections 28a and 28b and central frame section 28c. A trailing drawbar 30 is attached to the frame 28, and provides a connection for pulling another unit (e.g., an air seeder) behind implement 25. As shown, the trailing drawbar 30 may have a support wheel 31. Frame 28 is supported on the ground by a plurality of support wheels 32.

A plurality of ground-engaging openings configured to create furrows for placement of particulate material are spaced along frame 28 in a direction that is transverse to the direction of implement travel T. In the illustrated embodiment, disc gang units 41 are connected to the frame 28 of the implement 25. Each gang unit 41 has a longitudinal bar 40 that is pivotally connected, adjacent its forward end, to the frame 28. The bar 40 is supported, adjacent its rearward end, by one or more seed packing wheels 42.

In one exemplary distribution system, particulate material (i.e., seed and/or fertilizer) is metered from a central metering location for a full width of the implement. In another exemplary system, particulate material is metered from a bulk tank pulled in front or behind of the implement. The particulate material is carried to the ground injection point through a series of hoses and manifolds.

Figure 2:
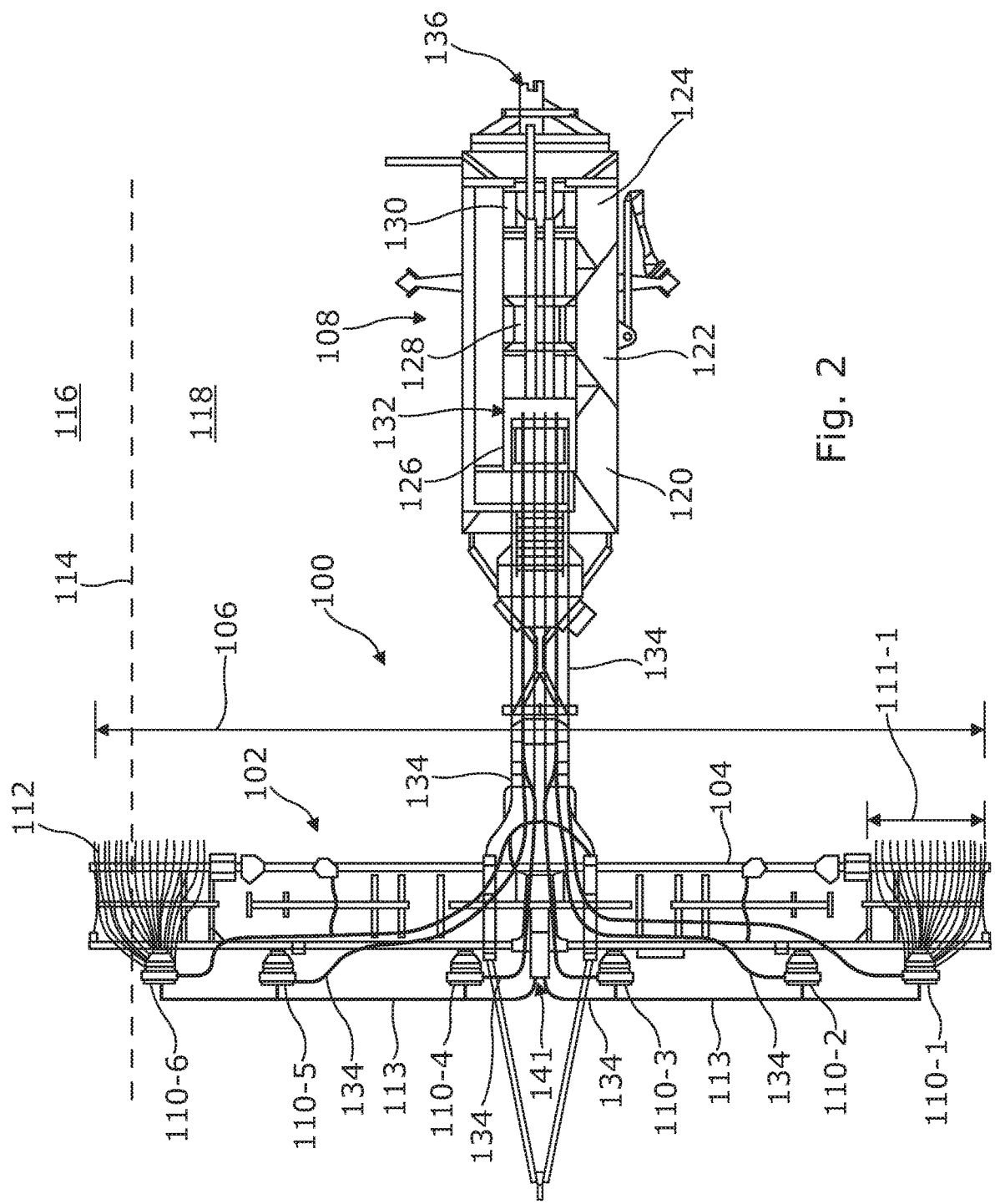
FIG. 2 is a schematic representation of an agricultural implement having a particulate distribution system, under one embodiment.

FIG. 2 is a schematic representation of a particulate distribution system 100 for use on an agricultural implement 102, under one embodiment. One example of an agricultural implement is illustrated in FIG. 1. Some features of agricultural implement 102 have been omitted for illustration convenience.

Implement 102 includes a frame 104 that supports a plurality of seeding units (not shown in FIG. 2). The seeding units comprise ground-engaging openers configured to create furrows in the ground and drop tubes for placement of particulate material in the furrows. In one example, a seeding unit comprises a seed flute configured for broadcast seeding.

The seeding units are distributed across a width 106 defining a seeding area that can be seeded during a single pass of implement 102. Width 106 comprises the distance between the outermost seeding units, and generally corresponds to a transverse length of frame 104. Examples of width 106 include, but are not limited to, 30, 40, 50, and 60 feet.

A particulate supply unit 108 is connected to and pulled behind implement 102. Unit 108 includes one or more tanks or bins for holding particulate material to be delivered to the seeding units.

Distribution system 100 includes a plurality of metering modules spaced apart along implement 102. In one example, at least two metering modules are used. In the illustrated embodiment, system 100 includes six metering modules 110-1, 110-2, 110-3, 110-4, 110-5, and 110-6, which are also referred to herein either collectively or individually as metering module(s) 110. Of course, more than or less than six metering modules can be used.

Each metering module 110 meters particulate material to a product dispensing section having a section width 111 each comprising at least one of the seeding units. FIG. 2 shows the section width 111-1 of the section supplied by metering module 110-1. In the illustrated embodiment, each metering module 110 meters particulate material to a plurality of the seeding units via lines 112. By way of example, but not limitation, in the embodiment illustrated in FIG. 2 implement 102 has 96 seeding units. Each module 110 meters particulate material to a different section each comprising a set of 16 seeding units. However, the number of metering modules 110 and seeding units can be selected based on, for example, the width 106 of implement 102 and desired spacing between furrows. The lines from metering modules 110-2, 110-3, 110-4, and 110-5 to their respective seeding units are not shown in FIG. 2 for illustration convenience.

Each metering module 110 is configured to control a flow rate of particulate material to its respective seeding units. The flow rate can be controlled, for example, based on a desired application rate per acre and a speed of travel of the implement across the ground.

In one example, gravity drop meters can be utilized in modules 110 for metering the particulate material to the seeding units. In the illustrated embodiment, the particulate material is delivered pneumatically from modules 110 to the ground injection points at the seeding units. For example, one or more blowers 141 are provided on implement 102 providing airflow to modules 110 via tubes 113.

Each metering module 110 may be configured to stop the flow of particulate material to one or more of the seeding units in a product dispensing section. For example, each metering module 110 can be configured to stop the flow of particulate material to individual ones, or all, of the seeding units being metered by the module 110. In this manner, a zone or sectional control scheme can be implemented to stop a portion of the seeding units across implement 102 to prevent application of seed to areas of ground where seeding is not desired and/or to prevent double application (i.e., seeding an area of ground that has already been seeded). By way of example, but not limitation, line 114 in FIG. 2 generally illustrates a boundary between a previously seeded area 116 and an area 118 to be seeded during a current pass of implement 102. Module 110-6 is controlled to stop the flow of particulate material to the seeding units that are positioned within area 116.

Particulate supply unit 108 illustratively includes a plurality of tanks 120, 122, and 124 each configured to hold a particulate material to be delivered to the seeding units. Of course, less than or more than three tanks can be used. Each tank 120, 122, and 124 has an opening 126, 128, and 130, respectively, in a bottom portion thereof.

The particulate material can be provided from unit 108 to implement 102 using any suitable distribution mechanism. For example, a mechanical mechanism such as an auger can be utilized. In another example, unit 108 comprises an air seeder that delivers the particulate material to implement 102 pneumatically.

In the illustrated embodiment, a distribution assembly 132 is configured to receive particulate material from tank 120 and pneumatically distribute the particulate material to the metering modules 110 via distribution tubes 134. In the illustrated example, a plurality of tubes 134 are provided with each one of the tubes 134 supplying one of the metering modules 110. A blower 136 is configured to provided a flow of air to distribution assembly 132 to assist the flow of particulate material through tubes 134. It is noted that in other examples, additional distribution assemblies 132 can be provided for tanks 122 and/or 124 for providing particulate material from those tanks to modules 110.

Figure 3:
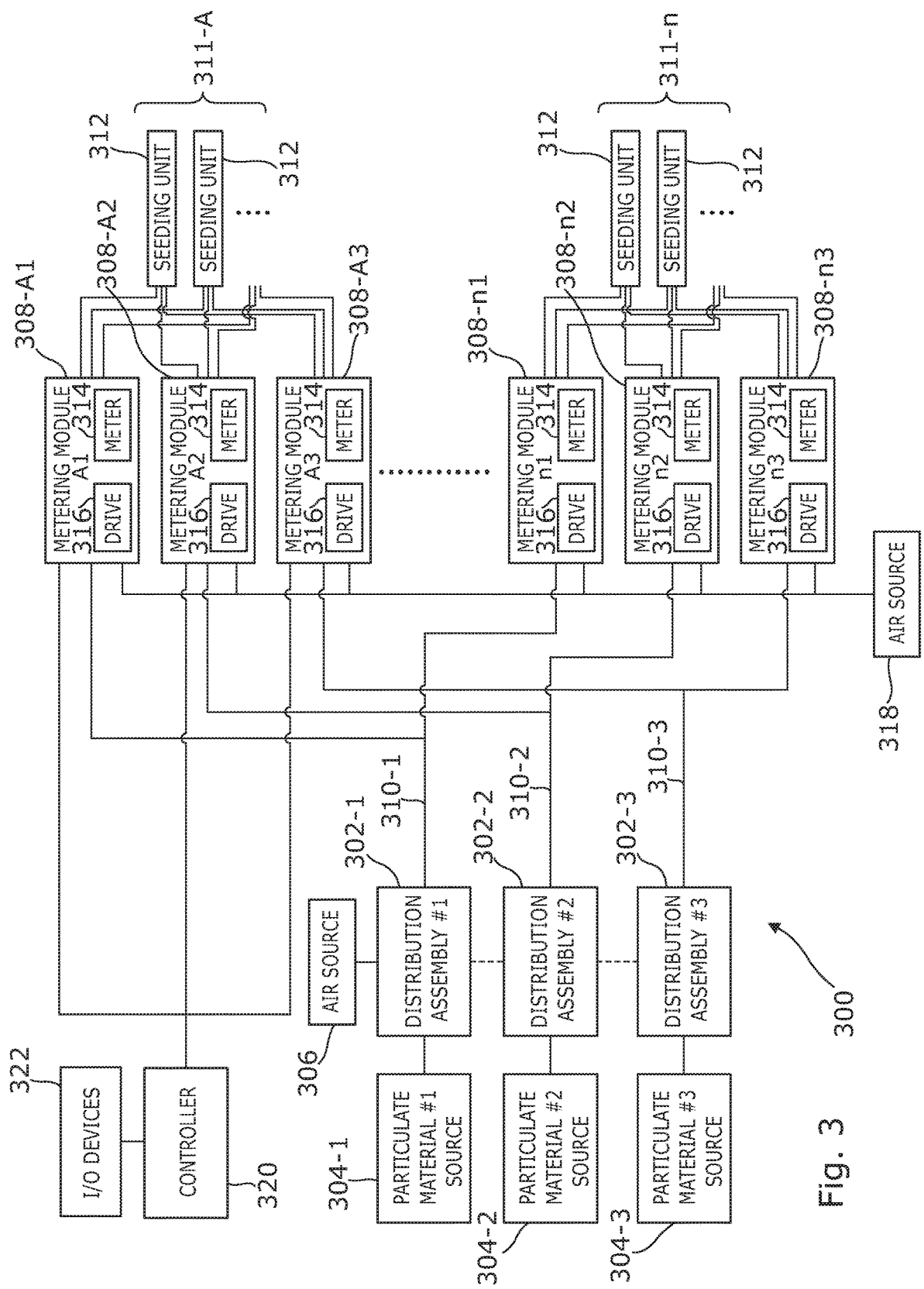
FIG. 3 is a schematic representation of a agricultural product application system, under one embodiment.

FIG. 3 is a schematic representation of an agricultural product application system 300, under one embodiment. As shown, three separate distribution assemblies 302 each receive particulate material from a respective product source 304 and, using a shared air source 306, provides the particulate material to metering modules 308 through distribution tubes 310. Each metering module 308 meters the particulate material to a product dispensing section 311, each comprising a set of seeding units 312. The ellipses in FIG. 3 represent that additional metering modules and seeding units can be present in system 300. Indeed, FIG. 3 shows only two metering modules 308 with corresponding product dispensing sections 311. However, it should be understood that more metering modules 308 may be provided depending on the working width of the implement and on the respective section widths.

Each metering module 308 includes a meter 314 and a meter drive 316. Meters 314 can be driven using any suitable driving mechanism. For example, meters 314 can comprise metering rollers that are turned by an electric, hydraulic, and/or pneumatic drive. In one example, a ground-engaging wheel can be used to turn a metering roller.

Each metering module 308 includes a drive 316 that can be controlled individually, for example using a controller 320. This allows the flow through a particular one of the metering modules 308 to be controlled independent of other ones of the metering modules 308. Input/output devices 322 can be provided, for example in a cab of a tractor, to allow a user to interface with the distribution system 300. The user can, for example, adjust particulate application rates or stop selected seeding units 312. An air source 318 provides a flow of air to metering modules 308 for pneumatically delivering the material to seeding units 312.

In one embodiment, controller 320 can be configured to control operation of air sources 306 and 318. For example, controller 320 can turn on/off air sources 306 and/or 318 and adjust a flow rate of the air.

In one embodiment, controller 320 can be configured to control a gate or other suitable mechanism at product sources 304 that controls a flow of product from sources 304. For example, controller 320 can be used to stop material flow into the respective distribution assemblies 302.

Although the illustrated system 300 of FIG. 3 comprises three product sources 304 with dedicated distribution assemblies 302, it should be understood that product application machines having more or less than three product sources can implement aspects of the invention. In an example, more simple, embodiment an air seeder may be adapted to apply only one product.

Figure 4:
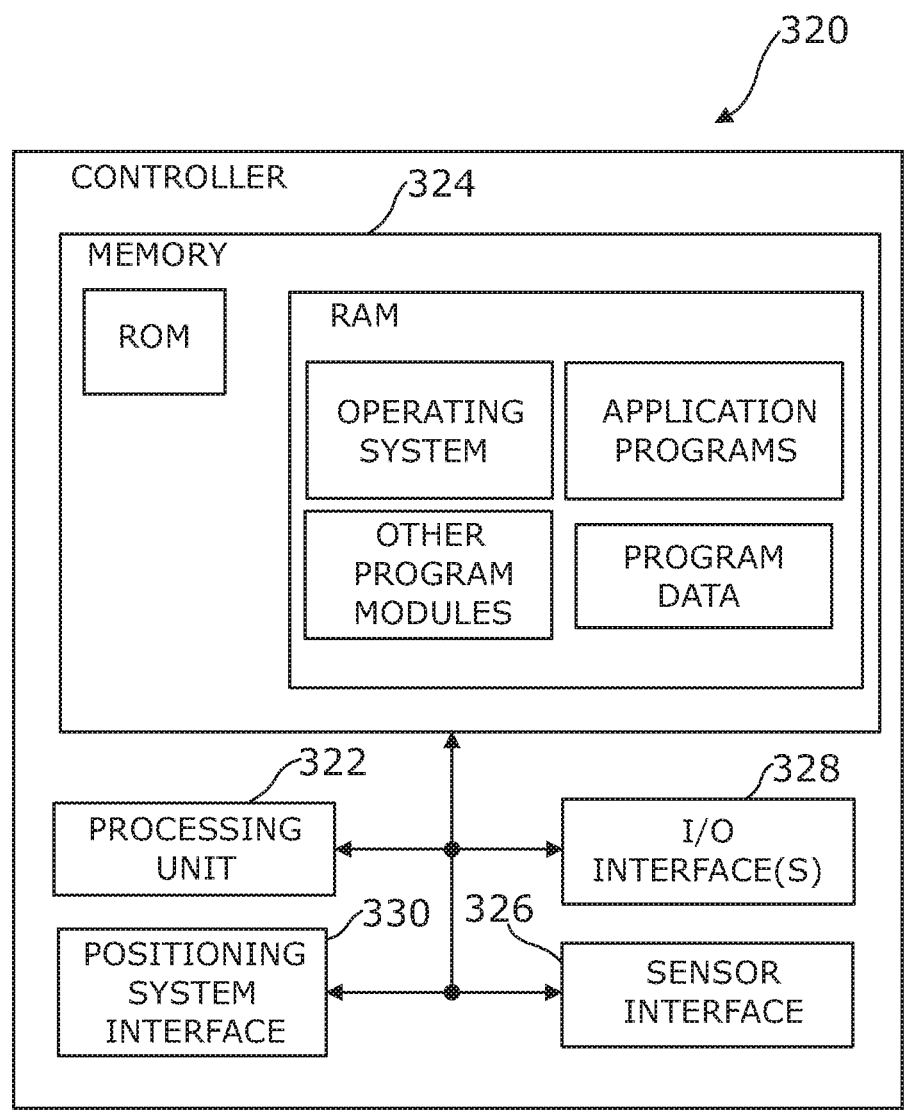
FIG. 4 is a schematic representation of a controller for an agricultural product application system, under one embodiment.

FIG. 4 illustrates one embodiment of controller 320. Controller 320 can include a processing unit 322 and memory 324 that is coupled to the processing unit 322. In the illustrated example, processing unit 322 is a computer processor with associated memory and timing circuitry (not separately shown) that is a functional part of the system and is activated by, and facilitates functionality of other parts or components of the system. Memory 324 can include computer storage media such as read only memory and random access memory. A number of program modules may be stored, such as application programs that can include instructions for controller 320.

A sensor interface 326 can be configured to receive feedback from sensors on the implement, such as a speed sensor that indicates a speed of travel of the implement. I/O interfaces 328 can be configured to receive signals from input devices that are operated by the user and provide signals to output devices, such as a display screen. A positioning system interface 330 can also be provided to receive positioning information indicating a spatial location of the implement. For example, a global positioning system (GPS) can be utilized to track a location of the implement. The location information can be used by controller 320 to automatically control metering modules 308. For example, the controller 320 can determine that an area over which the implement is traveling (e.g., area 116 in FIG. 2) has already been seeded and automatically stop particulate material flow to the seeding units in that area. In another example, other inputs such as, but not limited to, status information from material gates, air sources, etc., can be received at controller 320.

Figure 5A:
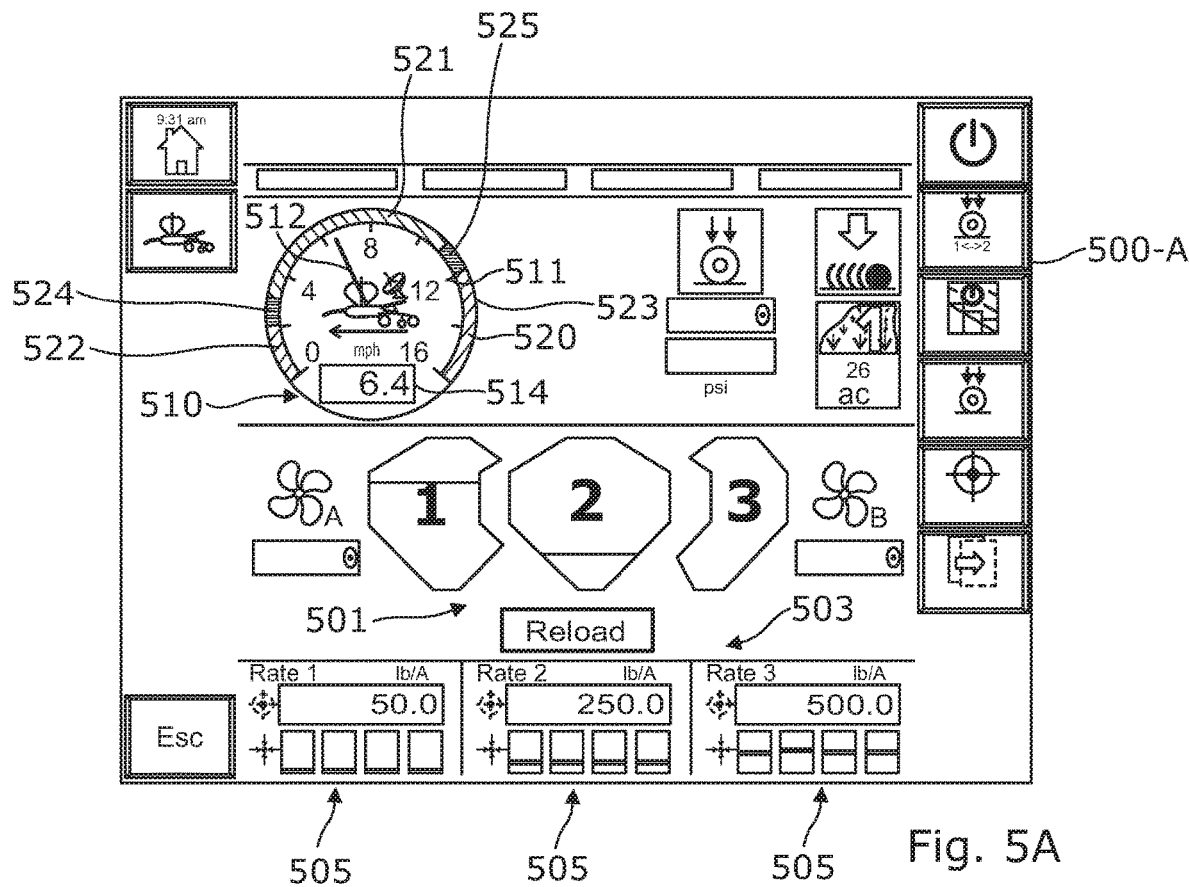
FIGS. 5A-C are representations of a displayed operator dashboard on a graphical user interface, under one embodiment of a multi-product system, shown in operation with different application rates.
Figure 5B:
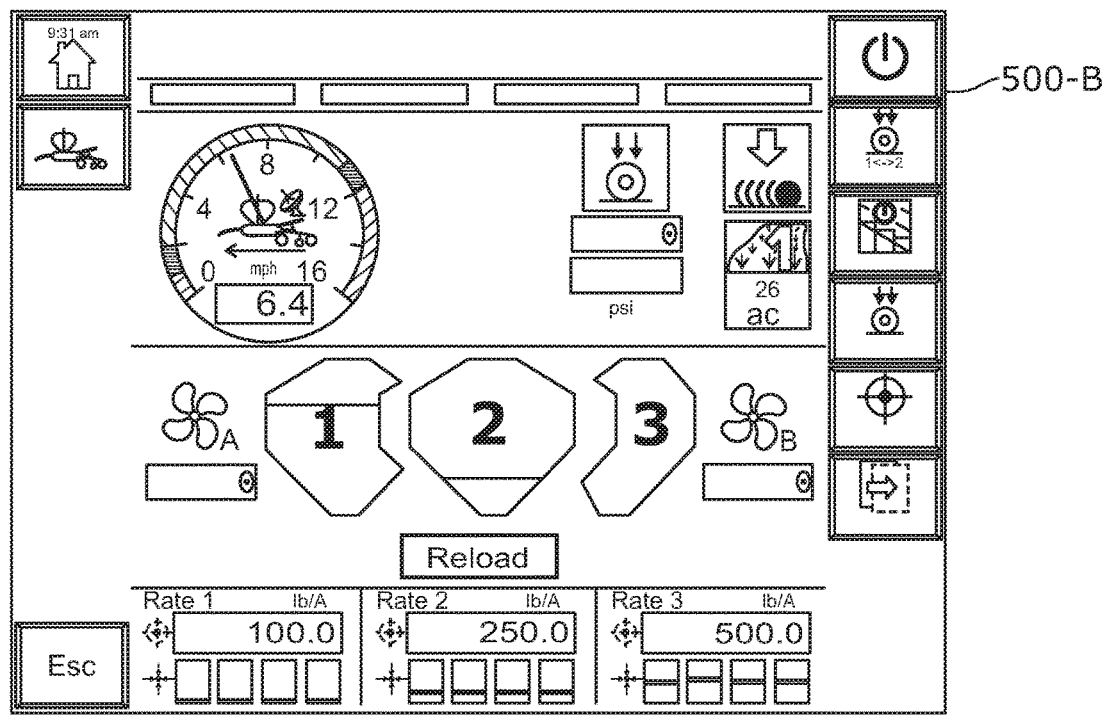
Figure 5C:
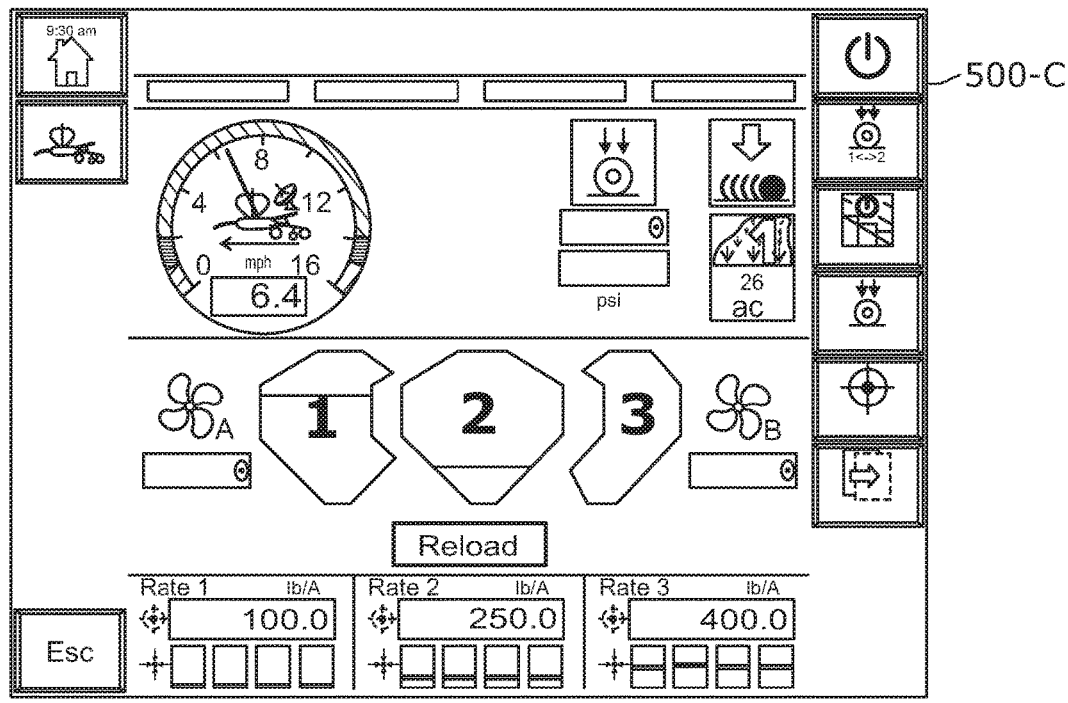

Controller 320 may be operable to control a graphical user interface in the form of a touch sensitive display for example. FIGS. 5A-C show representations of a displayed interactive operator dashboard which portrays machine parameters to an operator and allows the operator to enter commands and data for use by controller 320.

With reference to FIG. 5A, screen 500-A displays a graphical representation 501 of the fill states of the three product bins 304. The target application rate Q of each of the three products (in lb/acre (pounds per acre)) is shown at the bottom of the screen at 503, these values being entered manually by the operator via the display. The target application rate Q for product #1 is shown as 50.0 lb/acre. The target application rate Q for product #2 is shown as 250.0 lb/acre. The target application rate Q for product #3 is shown as 500.0 lb/acre.

The displayed operator dashboard also includes a speedometer 510 which is represented as an analogue-type with a circular dial have a scale 511 marked around the inside of the perimeter with speed values in miles per hour (mph). It should be understood that alternative speed units (kilometers per hour, meters per second) can be used instead. The displayed speedometer 510 includes a needle 512 which indicates to the operator the current forward speed of the application machine. The illustrated embodiment also includes a digital numeric display 514 of the forward speed.

Bar graphs 505 are displayed below the target application rates 503, the bar graphs 505 representing a drive speed of each meter 314. In the illustrated embodiment each product source has associated therewith four meters and hence four bars are shown below each target application rate value Q.

During operation each meter 314 is driven at a meter drive speed M to achieve the target application rate for the product being applied by that meter. The required meter drive speed M is dependent upon the target application rate Q (e.g., in lb/acre), a calibration number, the section width of the section 311 supplied by a given meter 314, and the forward speed of the machine.

The target application rate Q may be enter manually as described above, or determined from a geo-located application prescription map.

Figure 6A:
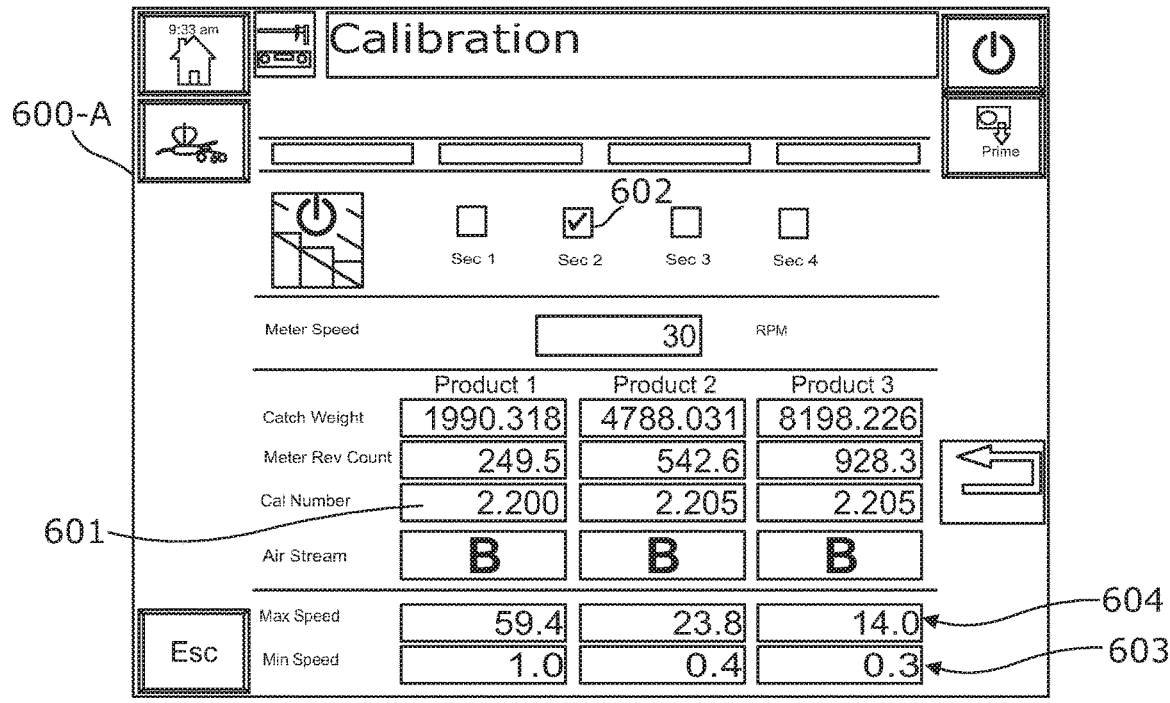
FIGS. 6A-B are representations of a displayed 'Calibration' screen on a graphical user interface, under one embodiment of a multi-product system.
Figure 6B:
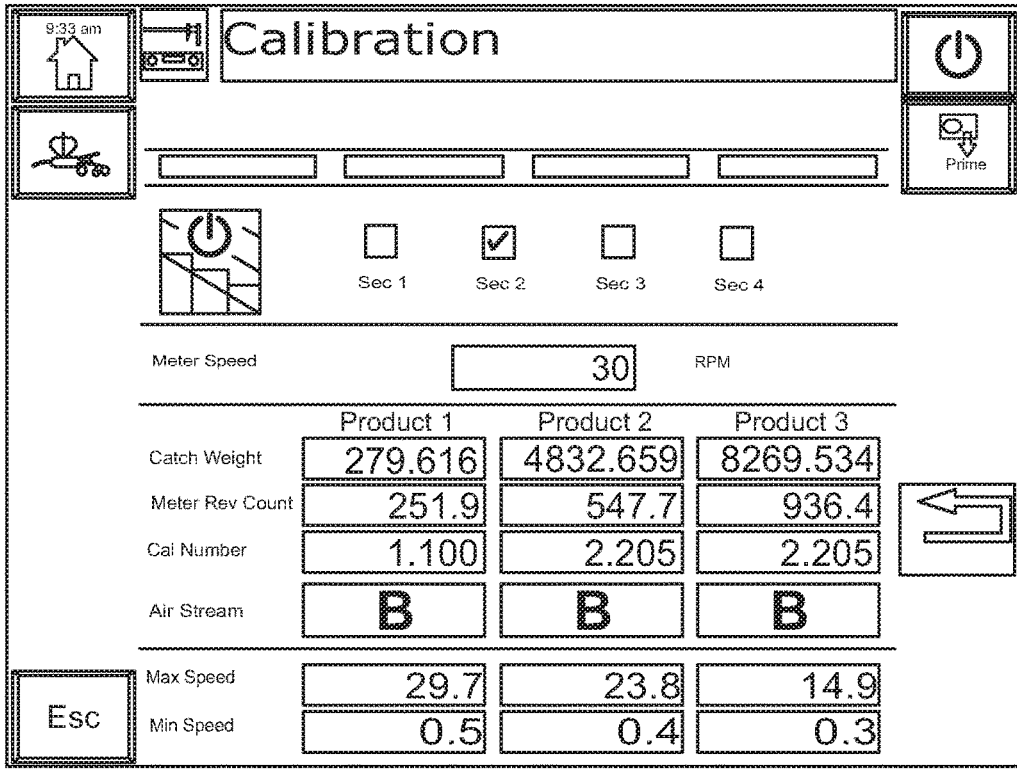

The calibration number is a numerical representation of the relationship between the operation of meter 314 and the weight of product dispensed, and has units of weight per revolution, for example lb. per revolution. The calibration number for each meter 314 may be determined manually by a user with a calibration routine wherein a sample of product is 'caught' using a known number of meter revolutions, and then weighed. For example, if the user catches 20 lb over 10 meter revolutions, then the calibration number would be 2.0 lb/revolution for that meter for that product and section. The calibration numbers can be entered through the display device manually via a 'Calibration' screen 600-A shown in FIG. 6A for example, wherein the entered calibration numbers are shown at 601. Alternatively the calibration number for each product can be received automatically from an electronic scale which weighs a sample of the given product over a known number of meter revolutions.

Figure 7:
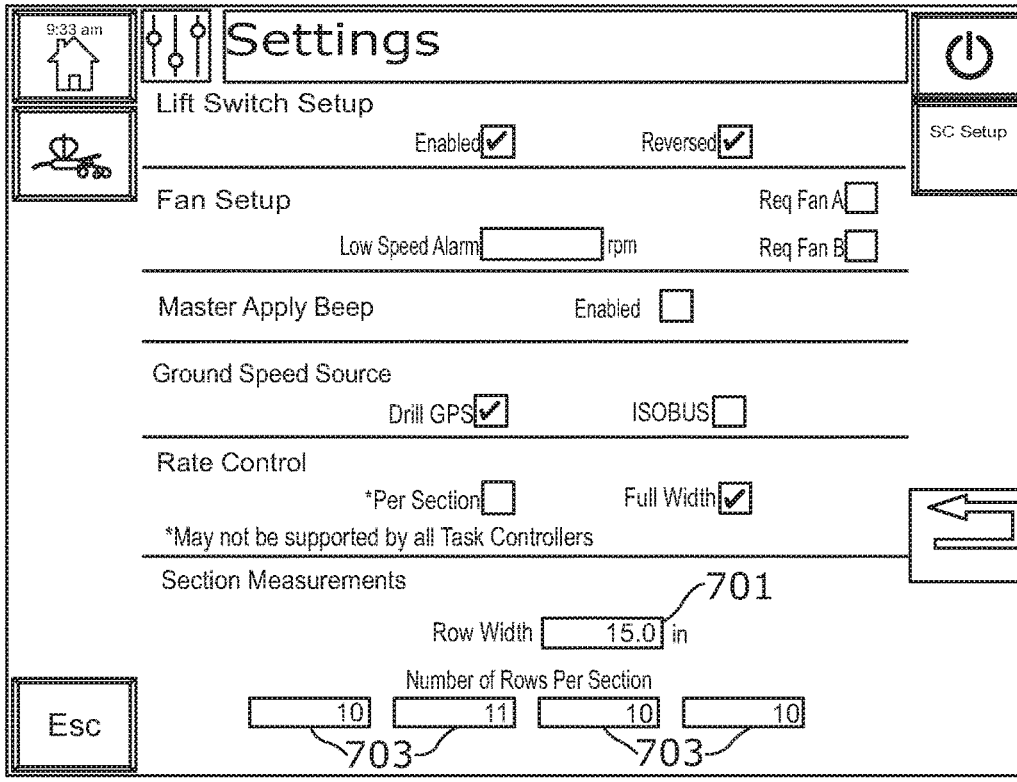
FIG. 7 is a representation of a displayed 'Settings' screen on a graphical user interface, under one embodiment.

The section width 111 for each section 311 may be determined by the controller 320 from a 'Row Width' value 701 and a 'Number of Rows Per Section' value 703 which are entered manually on a 'Settings' screen 700 shown in FIG. 7. In the illustrated example, the row width $w_r$ (the spacing between adjacent row units 311) is shown as 15.0 inches at 701. The number of rows per section $n_s$ are shown as 10, 11, 10, 10 respectively at 703 for the four sections 311. The section width $w_s$ for each section is calculated as follows:

$$w_s = w_r \cdot n_s$$

To ensure an accurate application rate Q is delivered, each meter 314 is preferably driven at a meter drive speed between a minimum motor speed $M_{min}$ and a maximum motor speed $M_{max}$ which may be in revolutions per minute (RPM). $M_{min}$ and $M_{max}$ may be dependent upon the product being applied by the associated meter and/or upon the operating limits of the meter drives 316.

$M_{min}$ and $M_{max}$ are determined for each metering module 308. $M_{min}$ and $M_{max}$ are minimum and maximum operating limits, respectively, of the product dispensing apparatus and are stored values which may depend upon the size of the receptacle above and/or on the product being dispensed.

In accordance with an aspect of the invention, a forward speed range is determined by the controller 320 based upon $M_{min}$ and $M_{max}$ and upon the target application rate Q.

Firstly, a minimum forward speed $s_{min}$ and a maximum forward speed $s_{max}$ is determined for each of the metering modules 308 (or for each product per section). The minimum forward speed $s_{min}$ is calculated as follows:

$$s_{min} = \frac{C \cdot M_{min} \cdot k}{Q \cdot w_s}$$

The maximum forward speed $s_{max}$ is calculated as follows:

$$s_{max} = \frac{C \cdot M_{max} \cdot k}{Q \cdot w_s}$$

wherein C is the calibration number for the given product, and k is a unit conversion constant.

Controller 320 then calculates a product minimum forward speed for each product source, this being the highest minimum forward speed $v_{min}$ for all sections. It should be understood that minimum forward speed values related to deactivated sections (having an application rate of zero) at any stage of operation can optionally be disregarded at this stage. The minimum forward speed value per product is then displayed on the Calibration screen as shown at 603.

Controller 320 then calculates a product maximum forward speed for each product source, this being the lowest maximum forward speed $v_{max}$ for all sections. It should be understood that maximum forward speed values related to deactivated sections (having an application rate of zero) at any stage of operation can be disregarded at this stage. The maximum forward speed value per product is then displayed on the Calibration screen as shown at 604.

A desired forward speed range is then defined between an overall minimum forward speed and an overall maximum forward speed. The overall minimum forward speed is determined as being the highest minimum forward speed $s_{min}$ for all active product sources and sections. The overall maximum forward speed is determined as being the lowest maximum forward speed $s_{min}$ for all active product sources and sections. During operation, the desired forward speed range may be periodically adapted as application rates for each product change and/or section widths are changed (for example by deactivating one or more row units 311).

In accordance with another aspect of the invention controller 320 generates display information for providing a visual representation of the desired forward speed range on the displayed operator dashboard 500. In the illustrated embodiment (FIG. 5A) the visual representation takes the form of a bar graph 520 displayed in association with the speedometer 510. The bar graph 520 includes a first bar 521 of a first color, preferably green, displayed adjacent to a first zone of the speed scale 511 corresponding to the desired forward speed range.

As will be appreciated, the first bar 521 is dynamically adapted in response to changes in the parameters (application rate, section width) that determine the desired forward speed range, particularly application rate, section width and product selection. With reference to the example illustrated in FIG. 5A, the desired forward speed range is represented by the green bar 521 and resides between 3 mph and 11 mph. Advantageously, this provides guidance to the operator to maintain the forward speed between 3 mph and 11 mph.

As mentioned above, the desired forward speed range may be adapted in response to a change in target application rate Q for example. With reference to FIG. 5B it can be seen that an increase in the target application rate Q for product source #1 (indicated at 'Rate 1') from 50.0 lb/acre (as shown in FIG. 5A) to 100.0 lb/acre has the effect of decreasing the lower limit of the desired forward speed range from 3 mph to 2 mph. This effect can be explained by the minimum motor speed limiting the forward speed at a given application rate, wherein that forward speed can be decreased if a higher target application rate is demanded.

Using FIG. 5B as the comparison, FIG. 5C shows a decrease in the target application rate Q for product source #3 (indicated at 'Rate 3') from 500.0 lb/acre to 400.0 lb/acre. This has the effect of increasing the upper limit of the desired forward speed range from 11 mph to 14 mph. This effect can be explained by the maximum motor speed limiting the forward speed at a given application rate, wherein that forward speed can be increased if a lower target application rate is demanded.

A second bar 522 of a second color, preferably red, is displayed adjacent to a second zone of the speed scale 511 which is outside of the first zone and corresponds to a non-preferred forward speed range. In the illustrated embodiment, the second bar 522 is displayed adjacent to a zone of the speed scale 511 representing speeds below the preferred forward speed range. As illustrated, the second bar 522 may extend around the outside of the perimeter of the speedometer 510 down to the minimum forward speed of the scale 511 (0 mph).

A third bar 523, preferably of the second color which is preferably red, is displayed adjacent to a third zone of the speed scale 511 which is outside of the first zone, and corresponds to another non-preferred forward speed range. In this instance, the non-preferred speed range includes speeds above the preferred forward speed range. As illustrated, the third bar 523 may extend around the outside of the perimeter of the speedometer 510 up to the maximum forward speed of the scale 511 (16 mph in the illustrated embodiment).

The second bar 522, first bar 521 and third bar 523 are all arcuate in shape and displayed in a series arrangement adjacent to the speed scale 511 and around the outside of the perimeter of the speedometer 510. The second and third bars 522, 523 improve clarity to the operator and indicate forward speeds that reside outside of the preferred forward speed range.

In one embodiment the bar graph includes fourth and fifth bars 524, 525 of a third color, preferably yellow. The fourth bar is positioned between the second and first bars 522, 521. The fifth bar 525 is positioned between the first and third bars 521, 523. The fourth and fifth bars 524, 525 serve to show to the operator a range of forward speeds at which accurate control of the target application rates is still achievable, but at which accuracy may become compromised. The fourth and fifth bars 524, 525 may be displayed having a fixed, for example spanning a forward speed range of 1 mph, and are positioned in a series relationship between the preferred and non-preferred forward speed ranges.

Although the above-described embodiments involve the motor speed of the metering modules as being operating limits that determine the desired forward speed range, it is envisaged that other operating parameters of product dispensing apparatus may instead represent operating limits. By way of example, a fluid pump that delivers pesticide solution to the boom of a crop sprayer may have lower and upper operating speeds which present operating limits in the determination of a desired forward speed range in accordance with an aspect of the invention.

Although the above-described embodiments include a plurality of product sources with individual target application rates, it is envisaged that aspects of the invention are applicable to simpler agricultural product application machines in which a single product is applied. It should be understood that varying the target application rate of said single product, or switching the row units on and off for example can affect the desired forward speed range.

Although the above-described embodiments include an air seeder having a plurality of sections supplied by independent metering modules, it is envisaged that aspects of the invention are applicable to agricultural application machines in which a plurality of metering modules each serve to control a flow rate of product to the entire machine width, albeit potentially for the metering of different products from different product sources.

Figure 8:
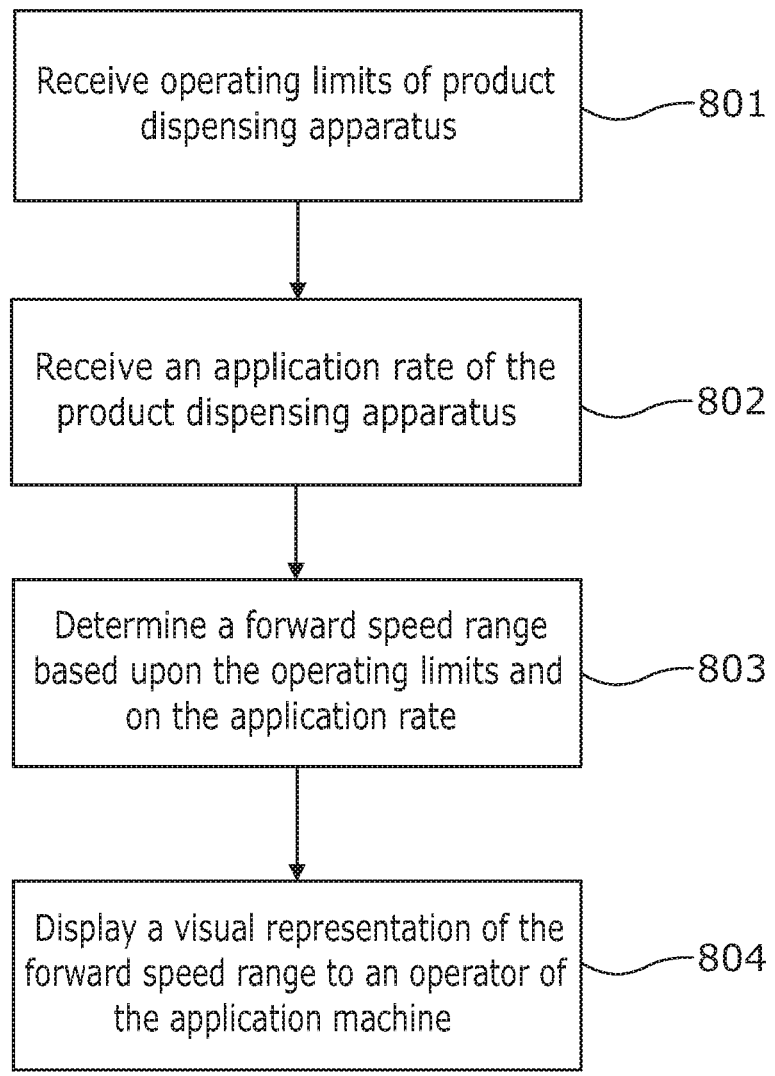
FIG. 8 is a flow chart of a method in accordance with an embodiment of the invention.

FIG. 8 illustrates a method in accordance with an aspect of the invention, the method comprising the steps of receiving operating limits of product dispensing apparatus 801, receiving an application rate of the product dispensing apparatus 802, determining a forward speed range based upon the operating limits and on the application rate 803, and displaying a visual representation of the forward speed range to an operator of the application machine 804.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

The invention claimed is:

1. A controller for an agricultural application machine, the controller configured to:
   receive operating limits of a product dispensing apparatus;
   receive an application rate of the product dispensing apparatus;
   determine a forward speed range based upon operating limits of the product dispensing apparatus and on the application rate; and
   generate display information to provide a visual representation of the forward speed range to an operator of the application machine.

2. The controller of claim 1, wherein the operating limits comprise a minimum operating limit and a maximum operating limit.

3. The controller of claim 2, wherein the operating limits comprise a minimum meter drive speed and a maximum meter drive speed.

4. The controller of claim 1, wherein the product dispensing apparatus comprises a plurality of product sources, wherein each one product source has associated therewith a respective metering module arranged to control a flow rate of product from the product source to at least one product dispensing unit, wherein the controller is further configured to:
   concurrently receive a plurality of application rates of the metering modules; and
   determine the forward speed range based upon the plurality of application rates.

5. The controller of claim 4, further configured to:
   determine a plurality of minimum forward speed values, wherein each one of the plurality of minimum forward speed values corresponds to a respective one of the plurality of application rates;
   select a highest minimum forward speed value from the plurality of minimum forward speed values; and,
   determine the forward speed range based upon the highest minimum forward speed value.

6. The controller of claim 4, further configured to:
   determine a plurality of maximum forward speed values, wherein each one of the plurality of maximum forward speed values corresponds to a respective one of the plurality of current application rates;
   select a lowest maximum forward speed value from the plurality of maximum forward speed values; and
   determine the forward speed range based upon the lowest maximum forward speed value.

7. The controller of claim 1, wherein the product dispensing apparatus comprises a plurality of metering modules, each metering module being arranged to control a flow rate of product from a product source to a respective product dispensing section having a section width and comprising one or more product dispensing units, wherein the controller is further configured to:
   receive a plurality of section width values, wherein each one of the plurality of section width values corresponds to a respective one of the product dispensing sections;
   determine a plurality of flow rate values based upon the section width values and the application rate, wherein each one of the plurality of flow rate values corresponds to a respective one of the plurality of metering modules; and
   determine the forward speed range based upon the plurality of flow rate values.

8. The controller of claim 1, wherein the controller is configured to receive the current application rate from a user interface device.

9. The controller of claim 1, comprising a memory configured to store an application prescription map, wherein the controller is in communication with a positioning system, and wherein the controller is configured to determine the application rate from a position signal received from the positioning system and the application prescription map.

10. An agricultural product application system comprising:
    a controller;
    a product dispensing apparatus including a metering module in communication with the controller and configured to control a flow rate of product from a product source to at least one product dispensing unit;
    a display device in communication with the controller;
    wherein the controller is configured to:
    receive operating limits of the product dispensing apparatus;
    receive an application rate of the product dispensing apparatus; and
    determine a forward speed range based upon the operating limits and on the application rate; and wherein the display device is configured to provide a visual representation of the forward speed range.

11. The system of claim 10, wherein the visual representation comprises a bar graph associated with a speedometer dial having a speed scale.

12. The system of claim 11, wherein the bar graph includes a first bar of a first color displayed adjacent to a first zone of the speed scale corresponding to the forward speed range, and a second bar of a second color displayed adjacent to a second zone of the speed scale, wherein the second zone is outside of the first zone and corresponds to a non-preferred forward speed range.

13. The system of claim 12, wherein the bar graph includes a third bar of the second color displayed adjacent to a third zone of the speed scale, wherein the third zone is outside of the first zone, and wherein the second zone, first zone, and third zone are positioned in series adjacent to the speed scale.

14. The system of claim 13, wherein the bar graph includes a fourth bar of a third color positioned between the second and first bars, and a fifth bar of the third color positioned between the first and third bars.

15. The system of claim 10, wherein the metering module comprises a meter and a meter drive, and wherein the operating limits include a minimum meter drive speed and a maximum meter drive speed.

16. The system of claim 10, wherein the product dispensing apparatus comprises a plurality of product sources, wherein each one product source has associated therewith a respective metering module, wherein the controller is further configured to:
concurrently receive a plurality of application rates of the metering modules; and
determine the forward speed range based upon the plurality of application rates.

17. The system of claim 10, wherein the product dispensing apparatus comprises an air seeder.

18. A method of controlling an agricultural input application system, the method comprising:
receiving operating limits of a product dispensing apparatus;
receiving an application rate of the product dispensing apparatus;
determining a forward speed range based upon the operating limits and on the application rate; and
displaying a visual representation of the forward speed range to an operator of the application machine.

19. The method of claim 18, further comprising displaying a current forward speed on a speedometer having a speed scale, wherein the visual representation of the forward speed range is displayed as a bar graph adjacent to a zone of the speed scale corresponding to the forward speed range.

20. The method of claim 18, further comprising:
concurrently receiving a plurality of application rates of a plurality of metering modules, wherein each metering module is arranged to control a flow rate of product from a respective product source to at least one product dispensing unit; and
determining the forward speed range based upon the plurality of application rates.

* * * * *